United States Patent [19]

Linn et al.

[11] Patent Number: 5,228,330

[45] Date of Patent: Jul. 20, 1993

[54] HERMETIC IC PACKAGE MOISTURE TESTER

[75] Inventors: Jack H. Linn; Richard W. Belcher, both of Melbourne, Fla.

[73] Assignee: Harris Corporation, Melbourne, Fla.

[21] Appl. No.: 839,426

[22] Filed: Feb. 20, 1992

[51] Int. Cl.[5] .............................................. G01M 3/32
[52] U.S. Cl. .......................................... 73/52; 73/49.3
[58] Field of Search ............... 73/52, 49.3, 45.4, 29.03

[56] References Cited

FOREIGN PATENT DOCUMENTS 267169 7/1970 U.S.S.R. ................................. 73/52

*Primary Examiner*—Hezron E. Williams
*Assistant Examiner*—Joseph W. Roskos
*Attorney, Agent, or Firm*—Joel I. Rosenblatt

[57] ABSTRACT

The amount of extraneous gas within a hermetic sealed package, such as water vapor, is measured by measuring the total gas pressure within the package. This gas pressure is compared to a correlation made of expected total pressure within a package to deviations to that total pressure to determine the amount of extraneous gas. The correlation itself is derived statistically by comparing samples of actual total pressure to expected total pressure. These samples are then used to statistically produce the above correlation which is then used in actual testing.

12 Claims, 1 Drawing Sheet

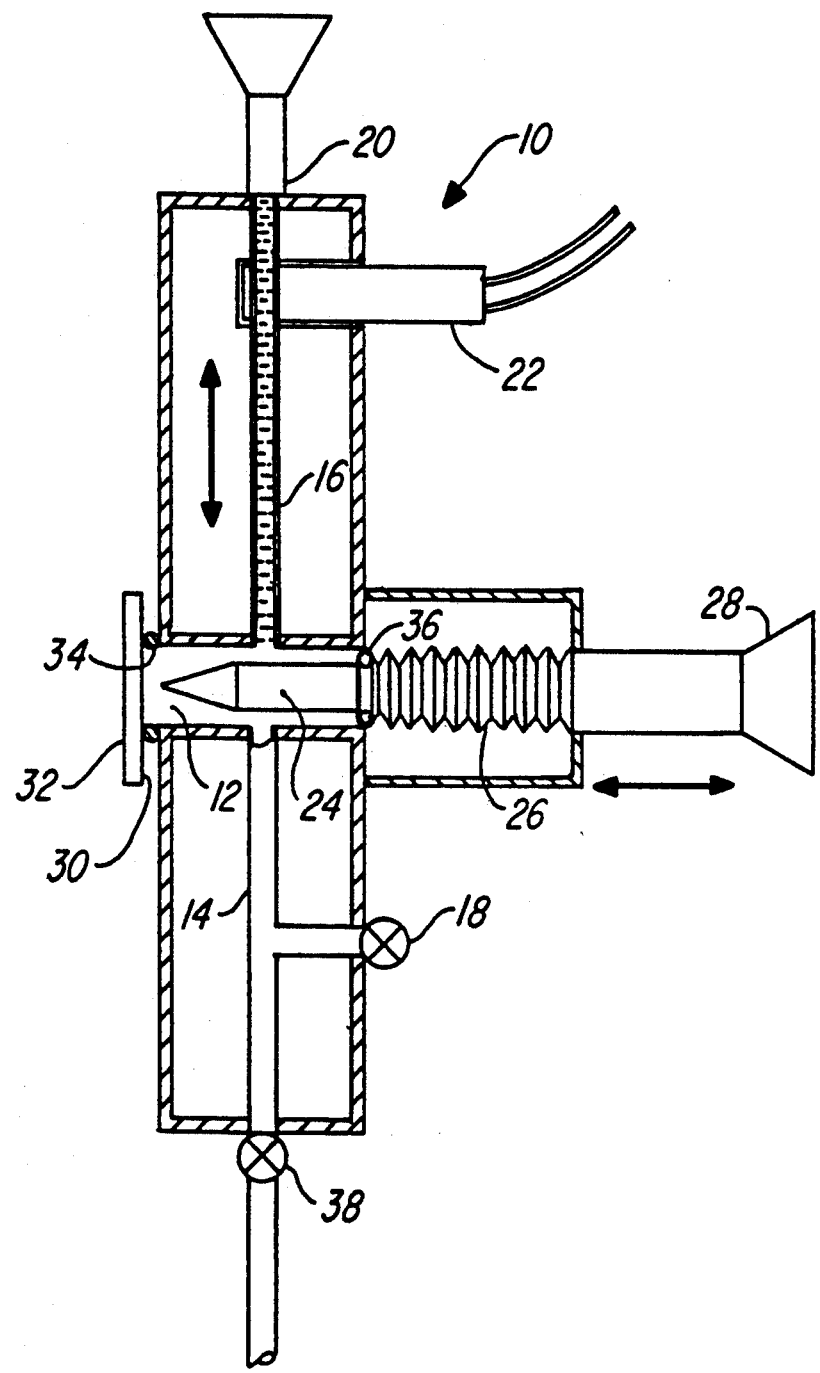

HERMETIC IC PACKAGE MOISTURE TESTER

FIELDS OF INVENTION

This invention is in the field of semiconductor manufacture and testing. More particularly, it is in the field of analyzing gaseous contents of a hermetically sealed package.

BACKGROUND

In semiconductor manufacturing, electrical devices are enclosed within a hermetic sealed package. The package is sealed within a controlled ambient environment. For example, the package may be sealed within a controlled environment designed to consist entirely of nitrogen ($N_2$). During the course of the sealing operation, other gases may enter the package. It is desirable to exclude any such extraneous gases from the sealed package. At the same time, recognizing such extraneous gases may enter the package, it is desirable to analyze the content of that package to determine if such extraneous gases are present. One such extraneous gas may be water ($H_2O$) in its gaseous phase.

A system for analyzing the content of a hermetic sealed package uses MASS SPECTROSCOPY. This MASS SPECTROSCOPY analysis is expensive and therefore limited.

SUMMARY OF INVENTION

This invention offers an alternate method of analyzing the extraneous gas contents within an hermetic sealed package. It employs a low cost and simple mechanism which is usable in most any location and is easily transportable. The inventive method may be explained with reference to DALTON'S LAW OF PARTIAL PRESSURES. This law is well known and describes a mixture of gases that are non-reactive. The law, as will be recognized by those skilled in the art, states that in a non-reactive gaseous mixture, the partial pressure of any such unreactive component gas in such a mixture is the pressure that component would assert if it was the only gas present in the volume under consideration. Further, the total pressure is such a non-reactive mixture is equal to the sum of the partial pressures of the component gases. In this case, where a hermetic sealed package is designed to contain gases $g1, g2, g3, \ldots gn$ then the total pressure of the gases within that hermetic sealed package $P_{TOTAL} = P_{g1} + P_{g2} + P_{g3} + \ldots + P_{gn}$ (the partial pressure of all the gases in the package).

According to the inventive method, for any known sealed package sealed within any known environment, the deviation or variation from the expected total pressure is an indication of the amount of extraneous gas in the sealed package. Further, the leakage or effusion of water vapor into an hermetic sealed package, such as for example from organic material, or condensation, such as would occur during the process of sealing, can be expected. This expectation can be measured statistically by conducting a series of tests. The results of these tests are used to correlate the deviation in the total pressure of the gases within the hermetic sealed package relative to or compared to the expected total pressure without any such leakage or effusion. The statistical samples can then be correlated to a substantially linear relationship of the partial pressure within the hermetic sealed package to the amount of extraneous gas such as $H_2O$. Once this sample is taken and the correlation made, the statistically determined relationship can be used when sampling other hermetic sealed packages to determine the extraneous gas content, or in particular the extraneous moisture content.

Along with a determination of the amount of extraneous gas present, an analysis may be conducted to determine the composition of the extraneous gas present. This analysis may be by MASS SPECTROSCOPY or any other suitable analysis.

According to the inventive principles, a package of a known volume and sealed within a known environment of non-reactive gases they predetermine pressure and temperature, should have an expected total pressure. In practice, however, the actual total pressure of the gases within that sealed package will deviate from the expected total pressure. As total pressure according to Dalton's Law is a measure of the non-reactive gas within the volume, the deviation indicates at least extraneous gases which do not originate as expected within the sealed environment. For example, such extraneous gases may be water vapor. In the practice of this invention, a sample of packages may be selected and the total gaseous volume in those packages measured. This may be easily done by opening these packages to a controlled volume having a predetermined temperature and measuring the pressure. This measured pressure is of the gas from the package but within the new total volume of the measuring device and the package. As will be explained below, that total volume according to the preferred embodiment is the volume of the measuring device and the volume of the package. The measured pressure can then be correlated to the pressure within the known volume of a package before that package was opened. In this way, a set of statistical samples can be gathered, each of the samples measuring the deviation of the actual total pressure within the package to the expected total pressure. Additionally, the gas content of the sealed package can be analyzed using MASS SPECTROSCOPY for example to determine the actual composition of the extraneous gas represented by that total pressure deviation. Using this information, a statistical correlation can be derived correlating the total pressure deviation from the expected total pressure with the amount of extraneous gas and the quality of that extraneous gas.

In the practice of this method according to the inventive principles, the preferred embodiment uses a mechanical device, such as a needle to puncture the hermetic sealed package. The gas is then drawn from the package into a sealed chamber. A pressure transducer measures the pressure of the gas in the chamber and accordingly the pressure of the gas in the package. The measured pressure value is then compared to the derived statistical relationship to a comparable sealed package to determine the unexpected or extraneous gaseous content within that package. This may be done in a number of steps starting with the measured deviation from the expected total pressure of the package of the measured total pressure, or may be done by a direct comparison to a statistically drawn chart. The apparatus used for the practice of this invention according to the inventive principles and in the preferred embodiment uses a means to adjust the volume within the measuring cavity as may be necessary for packages of different sizes and pressures.

Accordingly, what is shown is a method and system for measuring the extraneous gaseous contents of packages sealed in a controlled environment and having an expected total pressure. According to the inventive principles, the expected gaseous total pressure within the packages is determined; a set of statistical samples indicative of the actual gaseous total pressure within the packages is derived; the relationship between the expected gas total pressure and the actual gas pressure is derived from said samples is correlated to the amount of extraneous gas in said sealed packages. According to the inventive process a manufactured package is selected for test; the amount of total pressure within said manufactured package is measured; the measured total pressure is compared with said correlation to determine the amount of extraneous pressure.

DESCRIPTION OF THE PREFERRED EMBODIMENT

The FIGURE shows an apparatus which may be used for the practice of this inventive method.

As shown in the FIGURE, an apparatus 10 is shown in cross-section having an internal cavity 12. The internal cavity 12 communicates by means of passages 14 and 16 to other related portions of the apparatus cavity as will be explained.

Passage 14 provides a connection from cavity 12 to pressure sensor 18. Passage 16 provides a communication channel between cavity 12 and means 20 for adjusting the volume of cavity 12 and the communicating channels 16 and 14. A pencil heater is shown as 22 for controlling the temperature of the cavities of the apparatus 10.

Additionally shown is a needle 24 connected to a bellows 26 and a means 28 for imparting linear motion to the needle in its longitudinal direction and against the sealing surface 30 of a hermetically sealed package 32. The package 32 is arranged against o-ring 34 and is in a position for testing its sealed gaseous pressures. Additionally, the internal cavities 12, 14 and 16 are sealed by o-ring 36. Accordingly, the internal cavity is sealed from the ambient and the pressure sensor 18, is positioned to measure the total pressure within the hermetically sealed package 32 when the apparatus 10 is used according to the following description and inventive principles.

According to the inventive principles, operation of the preferred embodiment 10 is commenced by positioning an hermetic sealed package 32 against the o-ring 34 to seal the internal cavity 12 and communicating cavities 14 and 16, from the ambient. Linear motion in the longitudinal direction of the needle 24 is imparted to the device by handle 28 at the end of the bellows 26 moving the needle against the back surface 30 of the hermetic sealed package 32 and piercing that package. Upon the piercing of that back surface 30 of hermetically sealed package 32, the gas within that package escapes into cavity 12 and defuses through communicating channels 14 and 16. Volume adjuster 20 is preset so the total volume within internal cavities 16, 14 and 12 is a known quantity. Accordingly, in this way the reading of pressure sensor 18 is correlated to a known volume and can be correlated to the total pressure within the sealed package prior to the piercing operation described above. In the case of the preferred embodiment and according to the best mode, that volume is the total volume of the cavities 12, 14 and 16 and the pierced package 32. Once the pressure is read, a valve 38 may be used to exhaust the gas from cavities 12, 14 and 16 so a new test may be made.

As the pressure is read by pressure sensor 18, it is correlated against the known volume and temperature of the combined cavities 12, 14 and 16, as would be well known to those skilled in the art and is not discussed here.

In practice of the inventive method, sealed hermetic packages of substantially the same size and sealed in substantially the same ambient temperature are pierced and the pressure measured to produce the statistical sampling used to correlate the deviation from the expected pressure with the sealed recharge and the amount of extraneous gas or moisture in particular.

A statistically significant sample (N>20) of units of substantially the same size and sealed in substantially the same ambient are pierced and the total pressure measured. The internal gas from this sampling of units is also measured by MASS SPECTROSCOPY. The MASS SPECTROSCOPY verifies that the test units are indeed normal units (sealed correctly with the desired ambient) and representative of the normal sealing process. This procedure is undertaken for a variety of packages with different volumes. This procedure allows an 'average' or expected pressure to be calculated for each package cavity volume. Applying well known statistical methods, a normal range (upper and lower control limits) for any given package volume is calculated. Once the expected pressures are known for any package volume, test units can be pierced and their pressure readings compared to the normal values. Changes in pressure from the norm indicate changes in the internal gas constituency, indicating that extraneous gas is present.

The statistical samples can then be correlated according to well known statistical techniques to derive a relationship between the deviation to the expected total pressure within the hermetic's sealed package 32 from the expected total pressure and then correlated to the amount of extraneous gas such as water vapor within the hermetically sealed package. In the preferred embodiment, the statistical techniques and the number of samples chosen are as follows:

Once the statistical correlation is derived, it can then be used to measure the total pressure deviation and ultimately the extraneous gas or extraneous vapor gas content of an hermetically sealed package.

The preferred embodiment can be used in the place of MASS SPECTROSCOPY to determine the gaseous content of the sealed package. It is a less expensive alternative and requires a smaller and more portable unit. Additionally, the unit according to the preferred embodiment does not require the certification test of a MASS SPECTROSCOPY unit and can be used in remote location.

We claim:

1. A method for measuring the extraneous gaseous contents of packages sealed in a controlled environment and having an expected total pressure, comprising;
   (a) determining the expected gaseous total pressure within said packages;
   (b) deriving a set of statistical samples indicative of the actual gaseous total pressure within said packages;
   (c) correlating the relationship between the expected gaseous total pressure and said actual gaseous pressure derived from said samples, to the amount of extraneous gas in said sealed packages;
   (d) selecting a sealed package for test;

(e) measuring the amount of total gaseous pressure within said manufactured package;

(f) comparing said measured total gaseous pressure with said correlated relationship to determine the amount of extraneous pressure; and including the step of opening the said package to a sealed cavity of a known volume and temperature and measuring said gaseous total pressure in said cavity.

2. The method of claim 1, including the step of sealing said packages with a controlled gaseous content and temperature.

3. The method of claim 1, including the step of sealing the said packages to contain non-reactive gases.

4. The method of claim 1, including the step of adjusting the volume of said cavity relative to the expected volume of gas in said sealed package.

5. The method of claim 1, including the step of selecting a number of said packages substantially sufficient to provide a statistical sampling; measuring the total pressure of each of said packages selected for said sample; analyzing the deviation of the said measured total pressure of said sample packages from the said expected total pressure; statistically correlating the said deviation to determine the amount of extraneous gas in said sealed package.

6. The method of claim 5, including the step of statistically correlating the said deviation to determine the amount of water vapor in said sealed package.

7. A system for measuring the extraneous gaseous contents of packages sealed in a controlled environment and having an expected total pressure, comprising:

(a) means for correlating the relationship between an expected gaseous total pressure and said actual gaseous pressure derived from said samples, to the amount of extraneous gas in said sealed packages;

(b) means for selecting a sealed package for test;

(c) means for measuring the amount of total gaseous pressure within said sealed package;

(d) means for comparing said measured total gaseous pressure with said correlated relationship to determine the amount of extraneous gaseous pressure; and including means for opening the said package to a sealed cavity of a known volume and temperature and measuring said total gaseous pressure in said cavity.

8. The system of claim 7, including means for sealing said packages with a controlled gaseous content and temperature.

9. The system of claim 7, including means for sealing the said packages to contain non-reactive gases.

10. The system of claim 7, including means of adjusting the volume of said cavity relative to the expected volume of gas in said sealed package.

11. The system of claim 7, including means for selecting a number of said packages substantially sufficient to provide a statistical sampling; measuring the total pressure of each of said packages selected for said sample; analyzing the deviation of the said measured total pressure of said sample packages from the said expected total pressure; statistically correlating the said deviation to determine the amount of extraneous gas in said sealed package.

12. The system of claim 11, including means for statistically correlating the said deviation to determine the amount of water vapor in said sealed package.

* * * * *